July 6, 1965  J. A. GOOD ET AL  3,193,250
RESILIENT VALVE SEAT DESIGN
Filed July 16, 1962
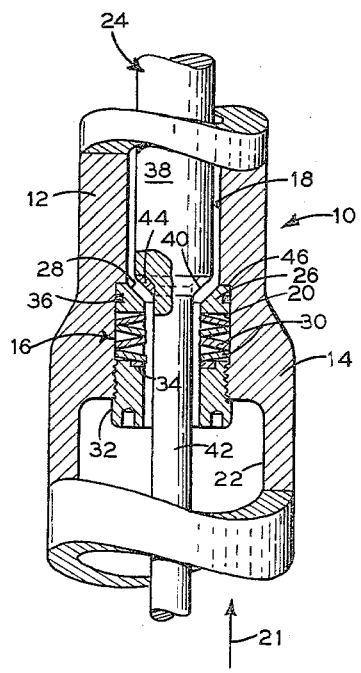
INVENTORS
James A. Good
BY  Donald E. Thoren
ATTORNEY

United States Patent Office 3,193,250
Patented July 6, 1965

3,193,250
RESILIENT VALVE SEAT DESIGN
James A. Good and Donald E. Thoren, Lynchburg, Va., assignors to The Babcock & Wilcox Company, New York, N.Y., a corporation of New Jersey
Filed July 16, 1962, Ser. No. 210,073
2 Claims. (Cl. 251—363)

This invention relates to a valve seat for use in a fluid flow control valve and more particularly to a resiliently mounted seat providing more reliable service and improved lifetime characteristics.

In many of today's fluid systems, particularly those involving extremely high flow rates and pressures, valves used therein are subject to more exacting requirements with respect to operating characteristics and satisfactory service life. Additionally, the requirement of many systems that the valve be of a quick closing type capable of stopping the flow of fluid in small fractions of a second further complicates valve design. The quick closing subjects the valve seat to severe impact, resulting in high energy absorption between the valve seat and the valve face, and after repeated closings even the hardest known valve internals material will show signs of wear and fatigue. As a result, the integrity of the sealing function of the valve will be impaired thereby necessitating its removal from service for repair or replacement of the valve seat and face.

Such severe valve operating conditions are encountered in valves having high velocity, reciprocating motion valve closure members. The reciprocating motion occurs, for example, in drive assemblies for transmitting linear motion while at the same time permitting flow of fluid therethrough, which flow must occasionally be sealed off, as illustrated by U.S. Patent No. 3,031,397. Hydraulic type snubbers may be used to reduce the effect of impact of the valve face upon the valve seat, but often this is not enough, even when a hard material such as Stellite is used for the mating valve seat and face surfaces. Upon repeated valve closure impacts, brinnelling occurs and the valve must be taken out of service for repair or replacement of the valve seat and face.

The present invention provides a valve arrangement whereby the valve seat is resiliently mounted within the valve body to absorb the impact energy when the valve closes quickly by resilient movement of the valve seat in response to the impact of the movable closure member, i.e., the valve face, thereagainst.

Also, the present invention discloses a valve body arranged for fluid flow therethrough, including a valve seat disposed within the body, and a movable closure member disposed within the valve body arranged to mate with the seat to thereby stop fluid flow therethrough, and means for sealingly and resiliently supporting the seat in the body to permit it to resiliently move in response to the force of the movable closure member as it contacts the seat.

Additionally, there is provided a plurality of spring washers disposed in contact with the seat to absorb the force of the impact of the closure member thereagainst.

The various features of novelty which characterize the invention are pointed out with particularity in the claims annexed to and forming a part of this specification. However, for a better understanding of the invention, its operating conditions and specific objects attained by its use, reference should be made to the accompanying drawing and descriptive matter in which we have illustrated and described a preferred embodiment of the invention.

The accompanying figure shows an elevation view, partly in section, of a valve 10 of the present invention. This valve includes a valve body 12, cylindrical in shape, having an enlarged integral portion 14 adapted to receive a seat assembly generally indicated by 16. The valve body 12 is provided with an axial opening therethrough having an inner bore 18 and adjacent recessed counter bore 20 in the enlarged portion 14 which opens into an adjacent enlarged bore 22, the assemblage being adapted to permit the reciprocal movement of closure member 24 therein. During operation fluid flow through the valve, as indicated by directional arrow 21, is through bore 22 and thence through the annular space defined by bore 18 and the reciprocating closure member 24.

The valve seat assembly 16 includes an annular valve seat member 26 formed of a hard, inflexible material disposed transversely to the axial opening formed by the counter bore 20 and has a beveled contacting surface 28. The seat is slidably retained in the recessed bore 20 by a plurality of spring washers 30 disposed in back-to-back relationship and in contacting relationship with a surface of the seat member opposite the contacting surface 28. The spring washers are, in turn, supported by an annular locking nut 32 which is threaded in the recessed bore 20 and has a spring seat 34 provided in the upper face thereof to prevent gouging of that surface by the lowermost spring washer. The spring washers are frusto-conical in shape and are so disposed that adjacent washers are inverted with respect to each other. The outside diameter of each washer is substantially that of counter bore 20 while the inner diameter is substantially that of the valve seat opening to permit fluid flow and the passage of the closure member therethrough. The number of individual washers required will vary with the amount of impact contemplated. The valve seat 26 is furnished with a piston ring type sliding seal 36 about its outer circumference which has a tight fit within and acts to form a seal with the recessed bore 20.

The reciprocating closure member 24 is provided with a portion having a large diameter 38 terminating in a tapered shoulder 40 having a hardened valve face 44. This face may be of Stellite, as may be valve seat 26, and in the closed position of the valve is adapted to mate with the valve seat and stop fluid flow therethrough. The depending portion of closure member with the smaller diameter 42 extends through the central portion of the spring washers 30 and the annular locking nut 32 and may be connected to a valve operating mechanism, not shown.

When the reciprocating member 24 is in the upward position, as illustrated, fluid may flow through the annular space formed by bore 22 and the depending portion 42 of closure member 24, through the central portion of the annular locking nut 32 and annular seat into the annular space formed by bore 18 and the portion of large diameter 38 of the reciprocating member. When the reciprocating member is moved downward, causing the valve face 44 to mate with the beveled surface 28 of the seat 26, fluid flow is stopped. Moreover, the piston type seal 36 prevents flow between seat 26 and the recessed bore 20. Should it be necessary to rapidly close the valve by driving the reciprocating member towards the valve seat at high velocity, with a resultant high impact force being imparted to the seat member, spring washers 30 will permit the valve seat member 26 to resiliently move coaxial with the valve axis upon impact, with the spring washers absorbing the major portion of the impact force and thereby reducing the severity of valve seat and face wear.

It should be noted that the spring washers 30 are commonly known as Belleville springs and are preferably utilized in this arrangement because of their ability to absorb large amounts of energy with comparatively small deflection. Furthermore, the utilization of Belleville springs results in longer service life because they are formed of metal and are not subject to deterioration as would be the case should an organic or synthetic material be used.

When the valve is subsequently opened, the springs 30 force the valve seat 26 upwardly against shoulder 46 between the recessed bore 20 and bore 18 which limits the upward movement of the valve seat.

It should be noted that an arrangement such as that illustrated could be utilized employing a closure member terminating at the valve seat.

As a result of the arrangement disclosed herein, it is possible to provide a valve capable of withstanding repeated impacts of the closure member against the valve seat without impairing the integrity of the seal, thereby resulting in higher integrity of the arrangement and in longer life minimizing the need for frequent maintenance.

While in accordance with the provisions of the statutes we have illustrated and described herein a specific form of the invention now known to us, those skilled in the art will understand that changes may be made in the form of the apparatus disclosed without departing from the spirit of the invention covered by our claims, and that certain features of the invention may sometimes be used to advantage without a corresponding use of the other features.

What is claimed is:

1. In a linear motion transmitting device comprising an operating member longitudinally movable within a tubular member, means for passing a fluid through said tubular member about said operating member, an annular valve seat slidably disposed within said tubular member about said operating member, said valve seat having a seat face and an opposite face and a substantially uniform outer diameter throughout its thickness, said operating member extending through said valve seat to transmit linear motion from a driving means on one side of said valve seat to a driven member on the opposite side of said valve seat, a valve face formed on said operating member constructed and arranged to mate with said valve seat face to stop said fluid flow through said tubular member, and a plurality of annular spring washers disposed around said operating member and in contacting relationship with said opposite face of said valve seat to permit said seat to resiliently move in response to the force of said operating member in contact therewith.

2. In a linear motion transmitting device comprising an operating member longitudinally movable within a tubular member, means for passing a fluid through said tubular member about said operating member, an annular valve seat slidably disposed within said tubular member about said operating member, said valve seat having a seat face and an opposite face and a substantially uniform outer diameter throughout its thickness, said operating member extending through said valve seat to transmit linear motion from a driving means on one side of said valve seat to a driven member on the opposite side of said valve seat, a valve face formed on said operating member constructed and arranged to mate with said valve seat face to stop said fluid flow through said tubular member, a plurality of annular spring washers disposed directly around said operating member and in contacting relationship with said opposite face of said valve seat to permit said seat to resiliently move in response to the force of said operating member in contact therewith, and an annular retaining member disposed around said operating member and engaging said tubular member to maintain said spring washers in contact with said opposite face of said valve seat.

References Cited by the Examiner

UNITED STATES PATENTS

| | | |
|---|---|---|
| 2,480,529 | 8/49 | Waag. |
| 2,650,617 | 9/53 | Wasser _____ 251—129 |
| 2,696,967 | 12/54 | Wilson et al. _____ 251—174 |
| 2,833,299 | 5/58 | Marriette _____ 251—174 |
| 2,866,477 | 12/58 | Bredtschneider et al. __ 251—174 X |
| 2,962,039 | 11/60 | Shand et al. _____ 251—174 X |
| 3,031,397 | 4/62 | Fortescue et al. _____ 176—36 X |
| 3,087,885 | 4/63 | Ertaud et al. _____ 176—86 X |
| 3,088,902 | 5/63 | Kumpf _____ 176—50 X |

FOREIGN PATENTS 677,132    8/52    Great Britain.

LAVERNE D. GEIGER, *Primary Examiner.*

M. CARY NELSON, *Examiner.*